United States Patent
Ikeda (10) Patent No.: US 7,511,850 B2
(45) Date of Patent: Mar. 31, 2009

(54) STORAGE MEDIA CONTROL CIRCUIT AND APPARATUS INCLUDING SAME

(75) Inventor: Tetsuhito Ikeda, Toyko (JP)

(73) Assignee: Canon Kabuhsiki Kaisha, Tokyo (JP)

(*) Notice: Subject to any disclaimer, the term of this patent is extended or adjusted under 35 U.S.C. 154(b) by 1116 days.

(21) Appl. No.: 10/780,630

(22) Filed: Feb. 19, 2004

(65) Prior Publication Data

US 2004/0167997 A1   Aug. 26, 2004

(30) Foreign Application Priority Data

Feb. 26, 2003   (JP) ............................... 2003-049967

(51) Int. Cl.
*G06K 15/00* (2006.01)
*G06F 13/28* (2006.01)

(52) U.S. Cl. .......................... 358/1.16; 365/7

(58) Field of Classification Search ................ 358/1.1, 358/1.9, 1.13, 1.15, 1.16, 1.17, 524, 426.05; 365/7, 49.01, 63, 220; 369/13.01, 13.07, 369/14, 15, 47.1, 272.1; 710/23, 100; 711/100, 711/148, 170; 720/615
See application file for complete search history.

(56) References Cited

U.S. PATENT DOCUMENTS

| | | | | |
|---|---|---|---|---|
| 5,786,885 A | | 7/1998 | Satoh | ......................... 395/309 |
| 5,860,134 A | * | 1/1999 | Cowell | ......................... 711/172 |
| 6,438,638 B1 | | 8/2002 | Jones et al. | .................. 710/301 |
| 7,162,549 B2 | * | 1/2007 | Mambakkam et al. | ......... 710/16 |
| 2002/0073271 A1 | * | 6/2002 | Yasugi et al. | ................ 711/102 |
| 2003/0067620 A1 | | 4/2003 | Masumoto et al. | .......... 358/1.13 |
| 2004/0030830 A1 | * | 2/2004 | Shimizu | ...................... 711/115 |
| 2004/0133712 A1 | * | 7/2004 | Yamamoto et al. | ............. 710/23 |

FOREIGN PATENT DOCUMENTS

| | | |
|---|---|---|
| JP | 05-325537 | 12/1993 |
| JP | 06-052375 | 2/1994 |
| JP | 07-078043 | 3/1995 |
| JP | 2001-177795 | 6/2001 |
| JP | 2001-273465 | 10/2001 |

* cited by examiner

*Primary Examiner*—Gabriel I Garcia
(74) *Attorney, Agent, or Firm*—Fitzpatrick, Cella, Harper & Scinto (57) ABSTRACT

A storage media control circuit for controlling inputs to and outputs from a plurality of types of storage media of different shapes and specifications is equipped with detection terminals provided for respective ones of the storage media of the plurality of types in order to detect the state of connection of each storage medium, and input/output terminals for inputting data to and outputting data from a storage medium whose connection has been detected by the detection terminals. The number of input/output terminals is made equal to the number of input/output signals of whichever storage medium has the largest number of input/output signals among the storage media of the plurality of types.

8 Claims, 9 Drawing Sheets

STORAGE MEDIA CONTROL CIRCUIT AND APPARATUS INCLUDING SAME

FIELD OF THE INVENTION

This invention relates to a storage media control circuit and to an apparatus that includes this circuit. More particularly, the invention relates to a technique for reducing the number of terminals of a storage media control circuit that controls inputs to and outputs from a plurality of types of storage media of different shapes and specifications.

BACKGROUND OF THE INVENTION

Printers for printing desired information such as text and images on sheet-like printing media such as paper and film are in wide use as information output devices in word processors, personal computers and facsimile machines.

In general, a printer is used by being connected to a host device such as a personal computer, data such as images and text to be printed is processed into a form suitable for printing by the printer by means of a printer driver that has been installed in the host device, the processed data is transmitted to the printer together with control data and the printer is caused to print the desired images and text.

Digital cameras have come into widespread use rapidly in recent years and are available in multifarious configurations from those capable of employing interchangeable lenses in a single-lens reflex silver-halide camera to those of small size and weight on which the emphasis is in portability. Memory cards used as the storage media for storing image data also are available in a variety of types having different shapes and interface specifications.

With the growing popularity of image input devices such as digital cameras, so-called direct printers have become the focus of attention. A direct printer has an interface for a storage medium, such as a memory card, for storing image data and is capable of reading and printing an image directly from the storage medium without the intervention of a host device.

Though many of these direct printers are adapted so as to be connectable to a host device, they are constructed in such a manner that when a memory card has been inserted into the printer, the processing necessary for printing the image data that has been stored on the memory card is executed entirely within the printer.

When an image that has been stored on a memory card for which the direct printer does not have a slot that supports this card is to be printed, it is necessary to insert the memory card into the available slot via an adapter or the like in order to achieve conformity with the specifications supported by the direct printer. In recent years, however, there has been an increase in direct printers provided with slots of multiple types for the purpose of supporting various types of memory cards.

Such a direct printer having slots of a plurality of types may be equipped with separate controllers (control ICs) for controlling respective ones of the interfaces that interface the memory cards. In a case where the interfaces for each of these memory cards are controlled by a single controller, the controller is provided with a large number of terminals in order that the memory cards may input and output signals independently of one another.

In general, a direct printer thus provided with slots of a plurality of types is incapable of accessing memory cards of a plurality of types simultaneously regardless of the fact that the printer is adapted to allow memory cards to be inserted into the slots simultaneously. For example, the memory cards are accessed upon establishing an order of priority, such as giving priority to the memory card inserted first.

Accordingly, though a controller in a direct printer having such a structure is provided with a large number of terminals, only some of these terminals are used. This tendency will become more pronounced as the types of printing media used by digital cameras increase, and hence the number of terminals with which the controller is provided will become exceedingly large.

As a consequence, when the controller is fabricated as an IC, the IC becomes large in size and so does the mounting area on a board. Another problem is a marked increase in the cost of the IC.

SUMMARY OF THE INVENTION

Accordingly, an object of the present invention is to reduce the number of terminals of a control circuit that controls access to any one type of storage medium from among accessible storage media of a plurality of types.

According to a first aspect of the present invention, the foregoing object is attained by a storage media control circuit for controlling inputs to and outputs from a plurality of types of storage media of different shapes and specifications, comprising: detection terminals provided for respective ones of the storage media of the plurality of types for detecting state of connection of each storage medium; and input/output terminals for inputting data to and outputting data from a storage medium whose connection has been detected by the detection terminals, wherein the number of input/output terminals is equal to the number of input/output signals of whichever storage medium has the largest number of input/output signals among the storage media of the plurality of types.

Thus, according to the present invention, a storage media control circuit for controlling inputs to and outputs from a plurality of types of storage media of different shapes and specifications is equipped with detection terminals provided for respective ones of the storage media of the plurality of types in order to detect the state of connection of each storage medium, and input/output terminals for inputting data to and outputting data from a storage medium whose connection has been detected by the detection terminals, wherein the number of input/output terminals is equal to the number of input/output signals of a storage medium having the largest number of input/output signals among the storage media of the plurality of types.

If this arrangement is adopted, the number of terminals for inputting and outputting data to and from a plurality of types of storage media of different shapes and specifications will be the number of input/output signals of whichever storage medium has the largest number of input/output signals among the storage media supported. The number of terminals for interface signals can be made the total of the number of input/output signals and the number of detection signals for detecting the state of connection of each storage medium. This makes it possible to reduce the number of terminals.

Since the number of terminals can be reduced, it is possible to reduce the package size and cost when the IC is manufactured and to conserve space on the board on which the IC is mounted.

Preferably, the circuit further comprises interface controllers provided for respective ones of the storage media of the plurality of types, and a selector for selecting an interface controller, which is to be connected to the input/output terminals, based upon signals from the detection terminals.

The circuit may further comprise an interrupt generator for generating an interrupt signal upon detecting a change in the connection state of a storage medium.

The storage media of the plurality of types may include memory cards using semiconductor storage elements.

The memory cards may be one of a compact flash card, a memory stick, a smart media card, an SD card, a multimedia card and an xD picture card.

The circuit may be formed as a single semiconductor device.

According to a second aspect of the present invention, the foregoing object is attained by a storage media control circuit for controlling inputs to and outputs from a plurality of types of storage media of different shapes and specifications, comprising: detection means for detecting the type of a storage medium that undergoes input/output of data; buffers for holding input data or output data with regard to this storage medium; first control means, which correspond to respective ones of the plurality of storage media, for performing control for accessing the storage media; selection means for selecting the buffers; and second control means for controlling selection of the first control means and the selection means in accordance with result of detection by the detection means.

In this case, the buffers may be a grouping of at least one of input data buffers, output data buffers and input/output data buffers.

Preferably, the output data buffers and input/output data buffers are capable of being set to a high impedance.

The present invention can be embodied not only as a storage media control circuit but also as a storage media control apparatus including a storage media control circuit and a slot unit, in which storage media of a plurality of types can be inserted, having an exclusion mechanism for limiting simultaneously inserted storage media to a single storage medium, and also as a printing apparatus including a storage media control circuit and a slot unit, in which storage media of a plurality of types can be inserted, having an exclusion mechanism for limiting simultaneously inserted storage media to a single storage medium, the printing apparatus being so adapted that it is possible to print image data that has been stored on storage media.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following embodiments, a printer will be described as an example of an apparatus according to the present invention for utilizing an inkjet printing system.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Further, the term "connection" means not only a physical connection between two devices but also the ability of the two devices to communicate electrically, and it does not matter whether the connection is by mechanical/physical means, by an interface or by a communication protocol.

Figure 2:
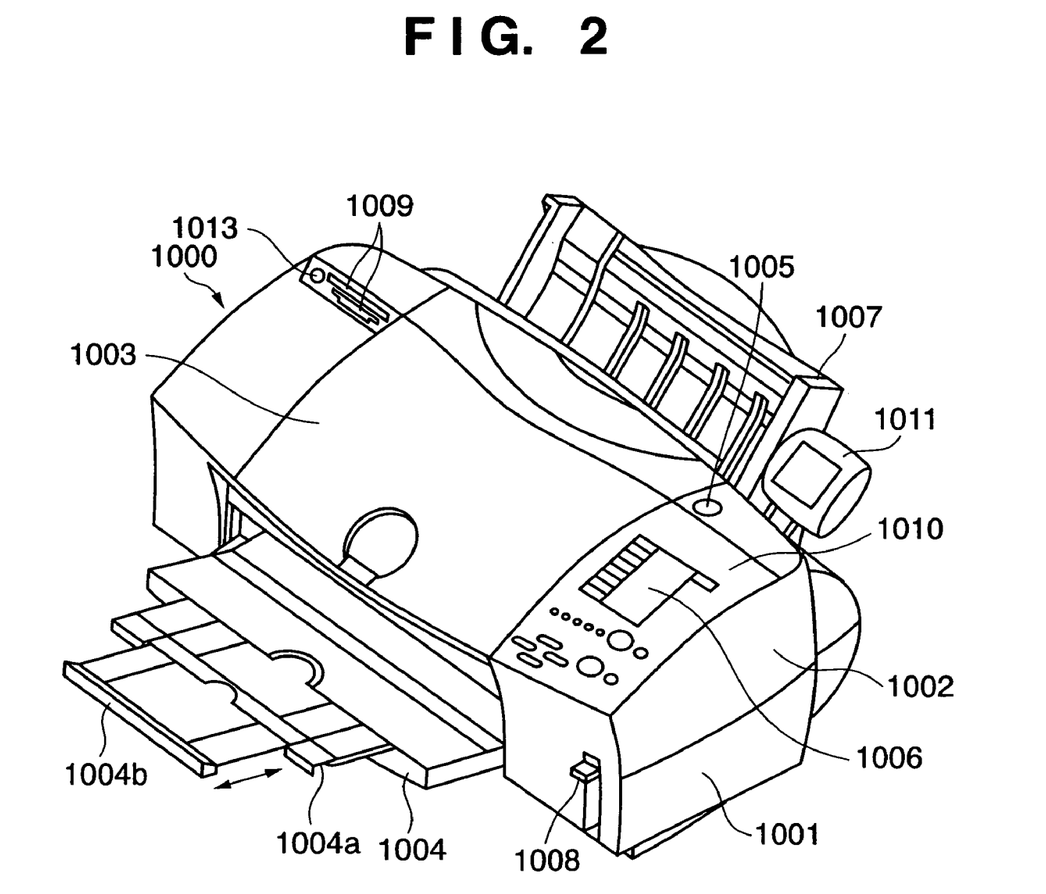
FIG. 2 is an external perspective view illustrating a direct printer according to this embodiment of the present invention.

FIG. 2 is an external perspective view illustrating a printer 1000 according to the present invention. The printer according to this embodiment has an ordinary personal-computer printer function for receiving and printing data from a host device such as a personal computer, and has a direct-printer function for directly reading image data, which has been stored on a storage medium such as a memory card, and printing the image data.

With regards to FIG. 2, the main body constituting the shell of the printer 1000 has a lower case 1001, an upper case 1002, an access cover 1003 and a discharge tray 1004. The lower case 1001 forms the approximate lower half of the printer 1000 and the upper case 1002 forms the approximate upper half. Combining the two cases constructs a hollow structure having an accommodating space internally accommodating mechanisms described later, and the upper side and front side of the structure are formed to have openings. The discharge tray 1004 has one end held rotatably on the lower case 1001. Rotating the discharge tray 1004 makes it possible to open and close the opening formed in the front side of the lower case 1001. When a printing operation is performed, the discharge tray 1004 is rotated forward to open the front opening, thereby making it possible to discharge the printing medium and stack the discharged sheets on the tray. Further, the discharge tray 1004 accommodates two auxiliary trays 1004a, 1004b. By pulling each tray forward as required, the area that supports the discharged sheets of printing medium can be increased or decreased in three stages.

The access cover 1003 has one end held rotatably on the upper case 1002. Rotating the access cover 1003 makes it possible to open and close the opening formed in the top side. Opening the access cover 1003 makes it possible to exchange a printhead cartridge (not shown) or ink tank (not shown), etc., housed within the main body of the apparatus. Though the details are not illustrated here, opening and closing the access cover 1003 causes a projection formed on the inner side thereof to turn a cover open/close lever. By using a microswitch or the like to detect the position to which this lever has been turned, whether the access cover is open or closed can be detected.

The top side of the upper case 1002 is provided with a power key 1005 that can be pressed.

The right side of the upper case 1002 is provided with a control panel 1010 having a liquid crystal display unit 1006 and various key switches, etc. The structure of the control panel 1010 will be described later in greater detail with reference to FIG. 3. An automatic feeder 1007 feeds a sheet-like printing medium into the interior of the printer body automatically. A paper-clearance selection lever 1008 is a lever for adjusting the clearance between the printhead and the printing medium.

The left side of the upper case 1002 is provided with a card slot unit 1009. In this embodiment, the card slot unit 1009 has three slots serving as slots into which various memory cards can be inserted. Image data that has been stored on a memory card inserted into any slot can be read in directly and printed. Examples of memory cards that can be supported are compact flash (CF) cards, smart media and memory sticks.

The printer according to this embodiment is such that the card slot unit 1009 has a memory-card exclusion mechanism for making it possible to insert only one memory card, from among the above-mentioned supportable memory cards, into any slot. More specifically, the card slot unit 1009 is equipped with a slide cover having insertion ports corresponding to respective ones of the three slots whose centers are offset from one another. When a memory card has been inserted into any one insertion port, the slide cover slides in conformity with the slot of this memory card.

The structure of the card slot unit 1009 and the arrangement of the exclusion mechanism in this embodiment will now be described in detail with reference to FIGS. 5 to 8.

Figure 5:
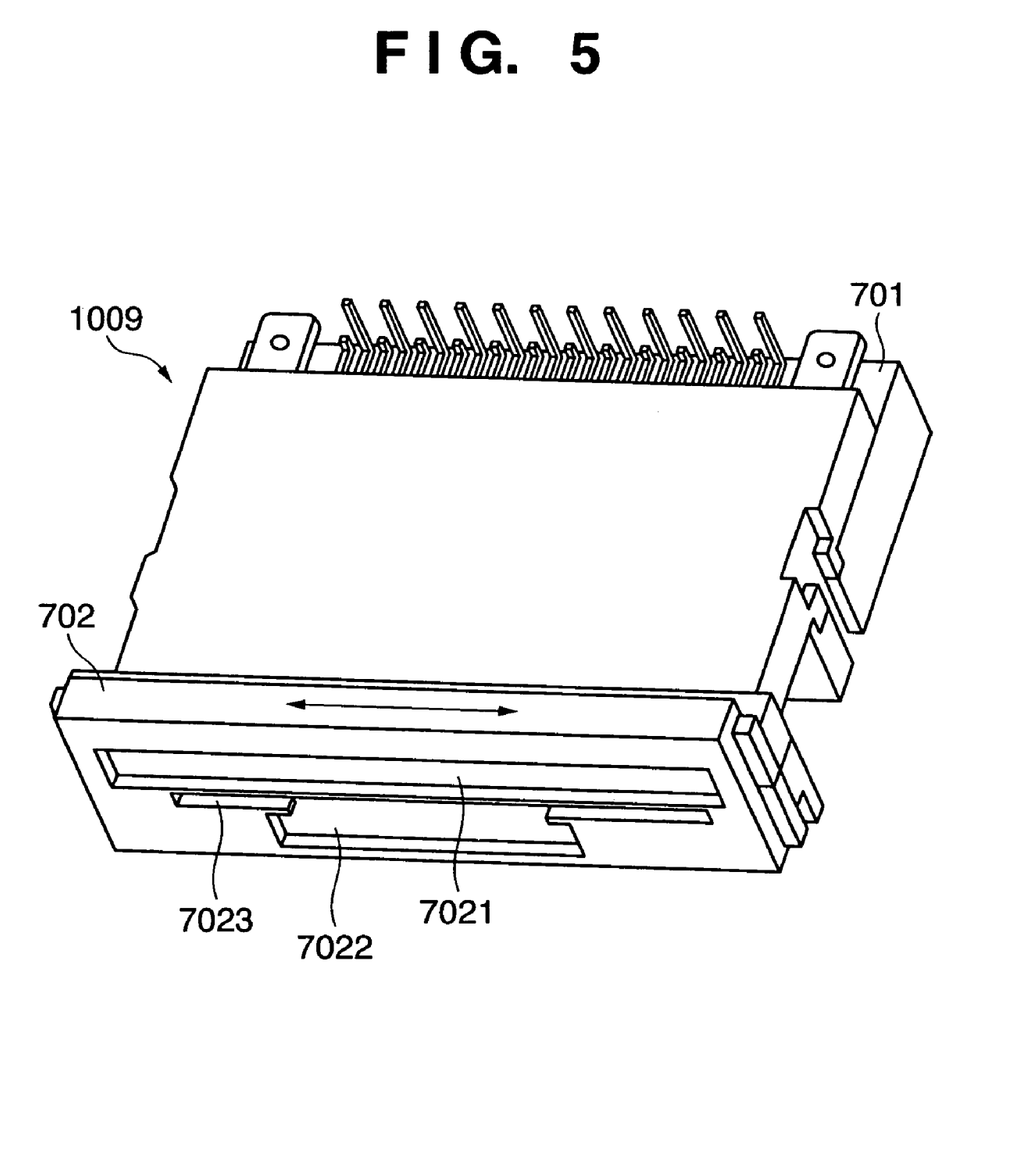
FIG. 5 is a perspective view illustrating the structure of a card slot unit in the printer of FIG. 2.

FIG. 5 is a diagram useful in describing the structure of the card slot unit 1009. As shown in FIG. 5, the card slot unit 1009 is provided with slots corresponding to respective ones of three types of memory cards, namely a compact flash card, memory stick and smart media card. The card slot unit 1009 comprises a connector 701 having terminals for electrical contact with the inserted memory card, and a slide cover 702 slidable back and forth and having three insertion ports 7021, 7022, 7023 corresponding to respective ones of the three slots.

Figure 6A:
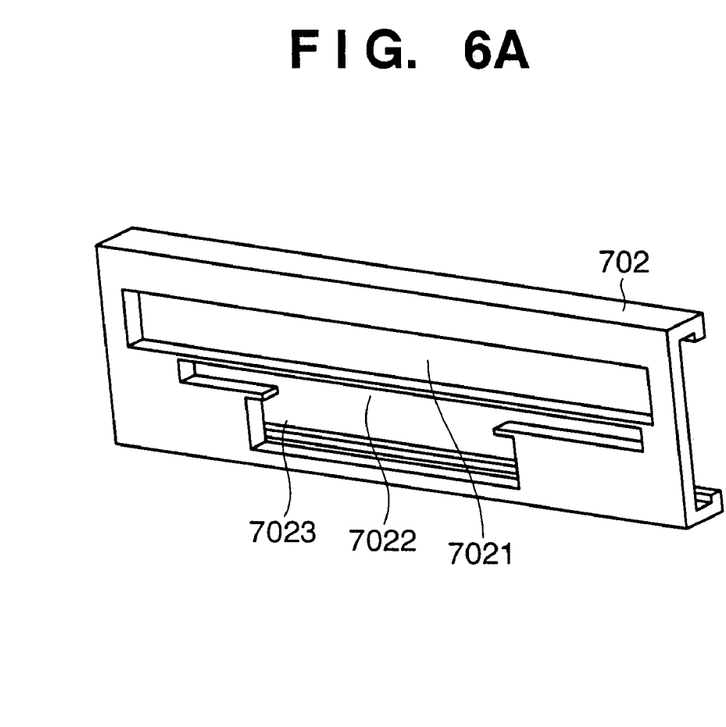
FIGS. 6A and 6B are diagrams illustrating the details of a slide cover of the card slot unit.
Figure 6B:
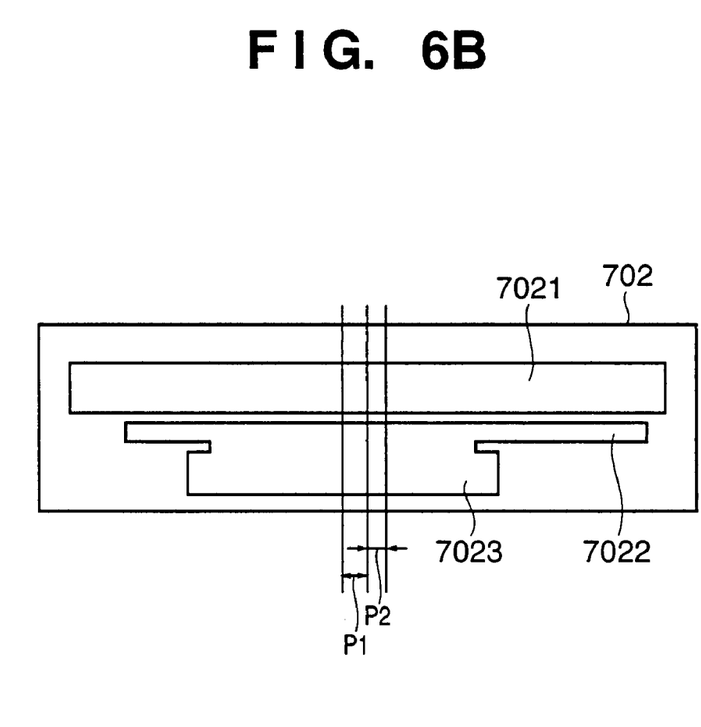

FIG. 6A is a perspective view of the slide cover 702, and FIG. 6B is a diagram illustrating the positional relationship of the three slots. The slide cover 702 is provided with the three insertion ports 7021, 7022, 7023 corresponding to the three slots. The three slots are arranged in such a manner that the centers thereof are offset from one another, as illustrated in FIG. 6B.

More specifically, whereas the center of the slot corresponding to the compact flash card coincides with the center of the slide cover 702, the center of the slot corresponding to the memory stick is offset to the left by P1. The memory stick can be inserted once the slide cover 702 has been slid leftward over the distance P1. The center of the slot corresponding to the smart media, on the other hand, is offset to right by P2. The smart media card can be inserted once the slide cover 702 has been slid rightward over the distance P2. In this embodiment, it is assumed that P1=P2=1.5 mm holds.

Figures 7A, 7B, 7C:
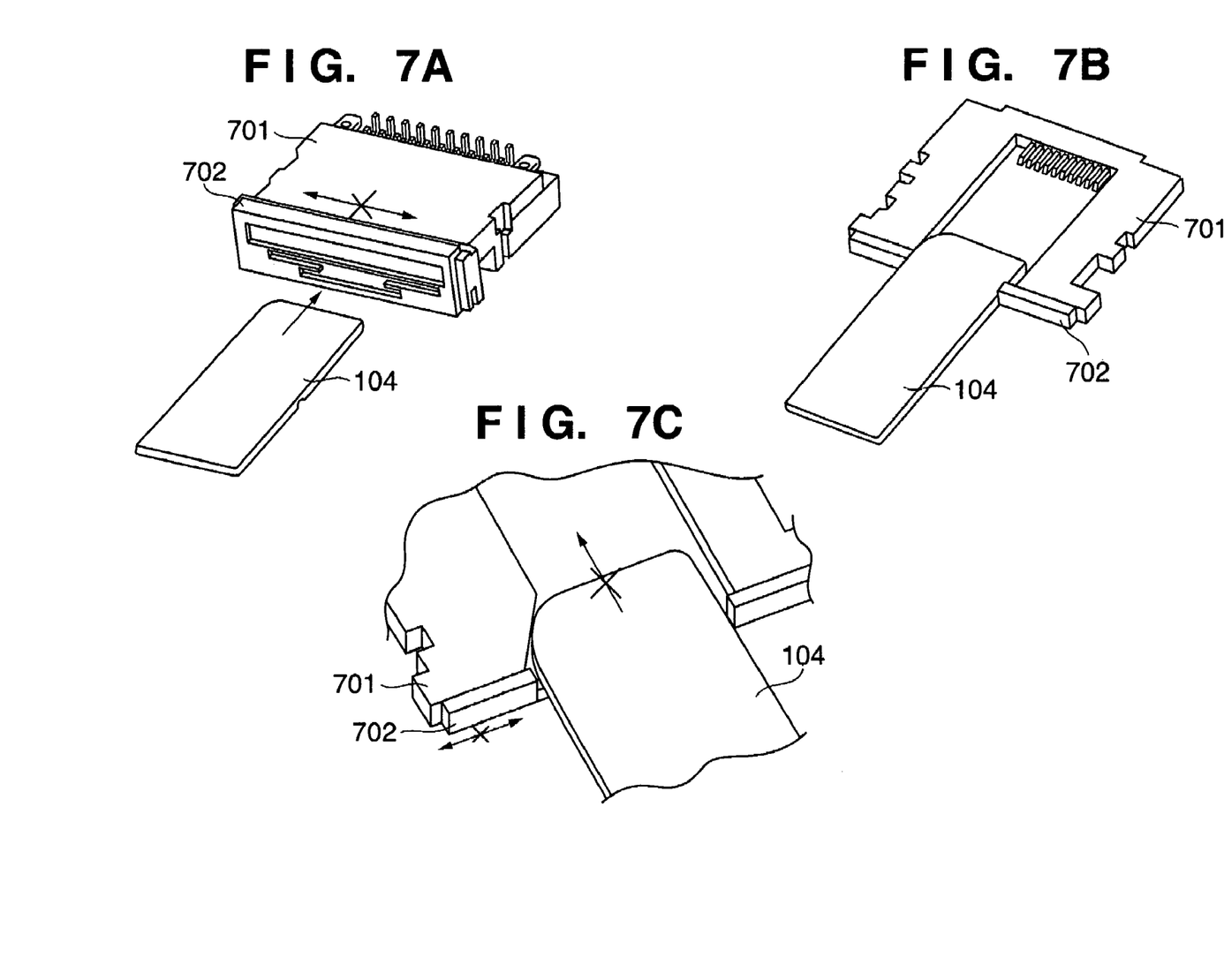
FIGS. 7A to 7C are diagrams for describing a first operation of an exclusion mechanism in the card slot assembly.

FIGS. 7A to 7C and FIGS. 8A to 8C are diagrams useful in describing the exclusion mechanism that employs the slide cover 702. FIGS. 7A to 7C illustrate a case where an attempt to insert the memory stick 104 is made after a compact flash card has been inserted.

FIG. 7A illustrates the state in which the compact flash card has been inserted. Here the slide cover 702 is fixed at a position that conforms to the slot of the compact flash card. Assume that the memory stick 104 is to be inserted under these circumstances. Since the center of the slot for the memory stick is offset 1.5 mm to the left of the center of the slot for the compact flash card, the insertion port for the memory stick 104 will not coincide with the slot for the memory stick. Therefore, as shown in FIG. 7B, the left edge of the memory stick strikes the housing of the connector and the memory stick cannot be inserted. FIG. 7C is an enlarged view of part of FIG. 7B and shows the state of abutting contact between the memory stick 104 and connector housing.

Figures 8A, 8B, 8C:
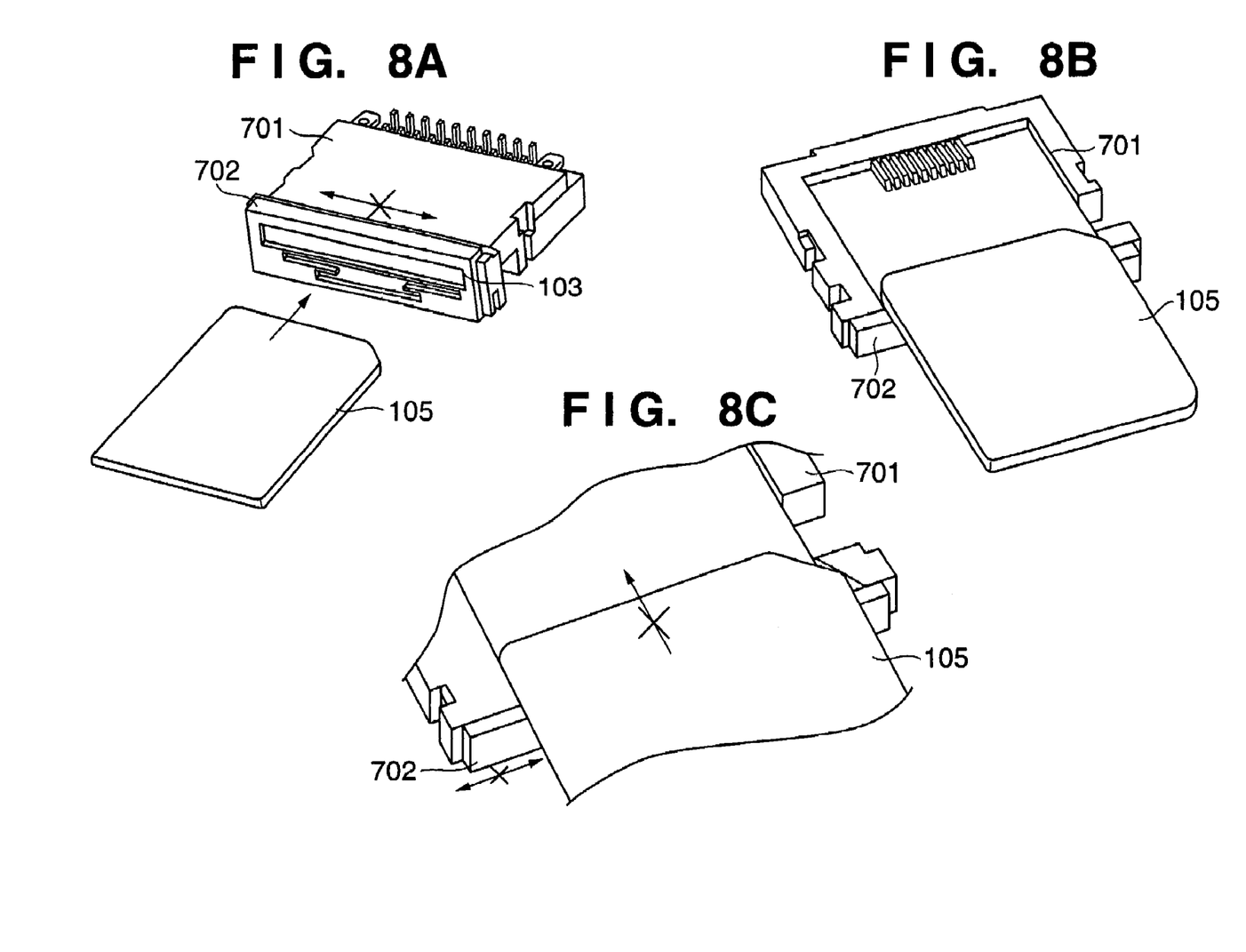
FIGS. 8A to 8C are diagrams for describing a second operation of the exclusion mechanism in the card slot assembly.

FIGS. 8A to 8C illustrate a case where an attempt to insert the smart media card 105 is made after a compact flash card has been inserted. FIG. 8A illustrates the state in which the compact flash card has been inserted. Here the slide cover 702 is fixed at a position that conforms to the slot of the compact flash card. Assume that the smart media card 105 is to be inserted under these circumstances. Since the center of the slot for the smart media card is offset 1.5 mm to the right of the center of the slot for the compact flash card, the insertion port for the smart media card 105 will not coincide with the slot for the smart media. Therefore, as shown in FIG. 8B, the right edge of the smart media card 105 strikes the housing of the connector and the smart media card 105 cannot be inserted. FIG. 8C is an enlarged view of part of FIG. 8B and shows the state of abutting contact between the smart media card 105 and connector housing.

With reference again to FIG. 2, a viewer (liquid crystal display) 1011 is capable of being removably attached to the main body of the printer. The viewer 1011 is used to display an image or index image frame by frame as in a case where an image that the user desires to print is searched and retrieved from images that have been stored on a memory card. A USB connector 1013 is for connecting a host device.

Figure 3:
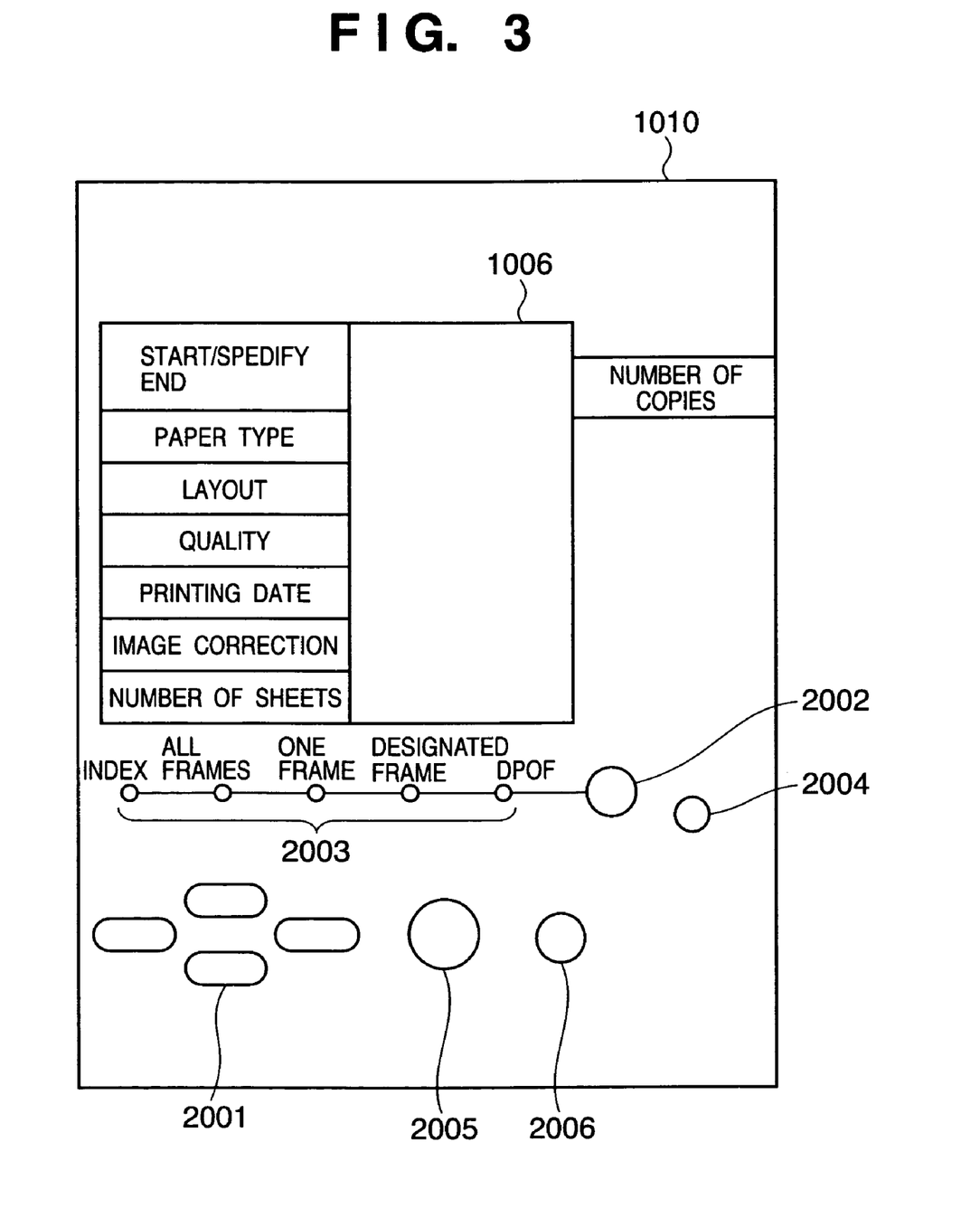
FIG. 3 is an external view of a control panel on the printer of FIG. 2.

FIG. 3 is an external view illustrating the structure of the control panel 1010 on the printer according to this embodiment.

As shown in FIG. 3, the liquid crystal display unit 1006 displays menu items for setting various data relating to items shown on the left and right sides. Examples of the items displayed are the number of the image at the beginning of the range desired to be printed and a specified frame number (START/SPECIFY) and the number (END) of the final image in the range desired to be printed; number of print copies (NUMBER OF COPIES); the type (PAPER TYPE) of printing medium (paper) to be used for printing; a setting (LAYOUT) of number of photographs to be printed on a single sheet of paper; a designation (QUALITY) of the print quality; a designation (PRINTING DATE) indicating whether or not the date on which image data was created should be printed; a designation (IMAGE CORRECTION) as to whether image data is to be corrected before being printed; and a display (NUMBER OF SHEETS) for displaying the number of sheets of paper necessary for printing. These items are selected or specified using a cursor key 2001.

Further, in a case where a host device has been connected and the host device is capable of accessing this printer, it is possible for image data on a memory card to be transferred to the host device.

A mode key 2002 is provided, and whenever the key is pressed, the type of printing (index printing, printing of all frames, printing of a single frame, etc.) can be changed over. A number of LEDs 2003 are provided and when a changeover is made to a type of printing, the corresponding LED lights up. A maintenance key 2004 is for performing printer maintenance such as cleaning of the printhead. A print start key 2005 is pressed when start of printing is specified or when a maintenance setting is finalized. A print stop button 2006 is pressed when printing is stopped or when stopping of maintenance is specified.

The arrangement of main components relating to control of the printer of this embodiment will now be described with reference to FIG. 4. Components in FIG. 4 similar to those of the above-described drawings are designated by like reference characters and need not be described again.

Figure 4:
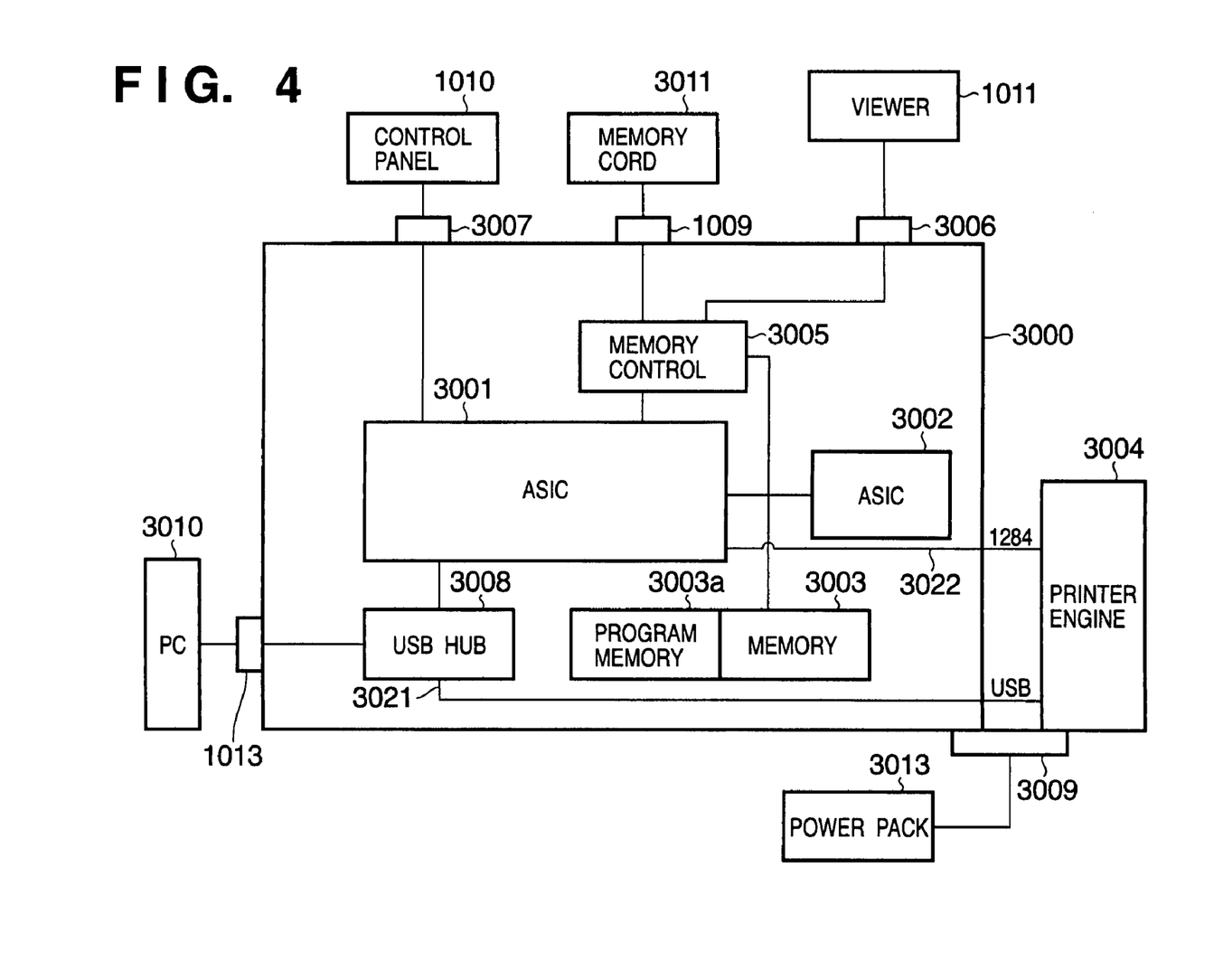
FIG. 4 is a block diagram illustrating the arrangement of main components relating to control of the printer of FIG. 2.

A controller (control board) 3000 is shown in FIG. 4. The control board has an ASIC (a special-purpose customized LSI chip) 3001 having an IEEE 1284 interface for exchanging data with a printer engine 3004 in a case where image data that has been stored on a memory card 3011 is printed without the intermediary of a host device; a USB interface for exchanging data with a personal computer 3010; a control-panel interface for inputting various operating signals from the control panel 1010 and outputting image data to the liquid crystal display unit 1006; a viewer interface for controlling display of image data on the viewer 1011; an interface for controlling interfacing with various switches and the LEDs 4009; and a CPU interface for exchanging data with a CPU 3002. These are interconnected by an internal bus (an ASIC bus).

The CPU 3002 executes system control and image processing such as a conversion from a luminance signal (RGB) to a density signal (CMYK), scaling, a gamma conversion and error diffusion. A memory 3003 has a program memory 3003a for storing a control program of the CPU 3002, a RAM area for storing the program at the time of execution, and a work area that functions as a work memory for storing image data. A printer engine 3004 is provided. Here the printer engine 3004 is for an ink-jet printer that prints a color image using color inks of a plurality of colors. A connector 3006 is for connecting the viewer 1011.

Based upon an instruction from the CPU 3002, a memory card control section 3005 reads image data, which has been stored on the memory card 3011 inserted into the card slot unit 1009, and writes data to the memory card 3011.

When the printer 1000 performs printing based upon print data from the personal computer 3010 connected as the host device, a USB hub 3008 allows data from the personal computer 3010 to pass through and outputs this data to the printer engine 3004 via a USB 3021. As a result, the connected personal computer 3010 is capable of printing while exchanging data and signals directly with the printer engine 3004. In other words, in this case, the printer functions as an ordinary personal-computer printer. DC voltage that has been converted from a commercial AC power supply by a power pack 3013 is input to the apparatus by a power-supply connector 3009.

The personal computer 3010 is an ordinary personal computer that is connected as the host device. A printer driver that executes printing in the ordinary personal-computer printer mode and that is associated with the printer of this embodiment is installed in the personal computer 3010. The aforementioned memory card is indicated at 3011.

It should be noted that the exchange of signals between the controller 3000 and printer engine 3004 is performed via the USB 3021 or IEEE 1284 bus 3022.

Memory-card-related access control according to this embodiment of the invention will now be described with regard to a direct printer having the structure set forth above. This embodiment will be described in relation to access control in a case where use is made of four types of memory cards, namely a compact flash card, a memory stick, smart media and an SD (secure digital) card (all of which are registered trademarks).

Figure 1:
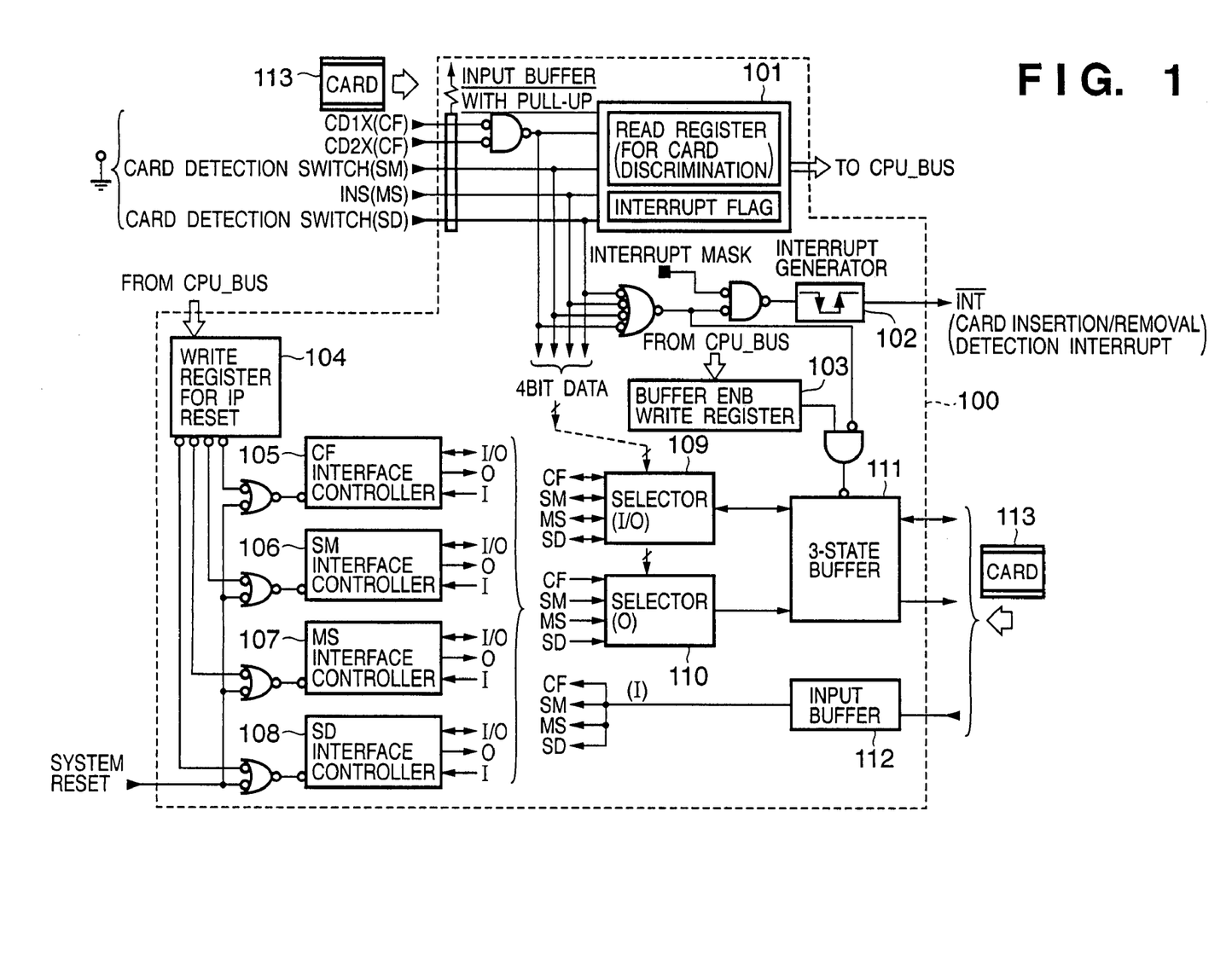
FIG. 1 is a block diagram illustrating the structure of a control unit embodying the present invention.

FIG. 1 is a block diagram illustrating the general structure of a memory card control IC 100, which corresponds to the memory card control section 3005 of FIG. 4, according to this embodiment of the present invention.

The memory control IC 100 of this embodiment includes a read register 101, an interrupt generator 102, write registers 103 and 104, interface controllers 105 to 108, selectors 109 and 110, a tri-state buffer 111 and an input buffer 112.

If a memory card 113 is inserted into the slot unit, an interrupt signal is generated by the interrupt generator 102 to notify the CPU that the memory card has been inserted. The interrupt generator 102 is adapted to generate an interrupt signal when the memory card is inserted and also when the card is removed. The interrupt generator 102 includes a dual-edge detector for detecting both of a rising edge and a falling edge.

In response to the interrupt signal, the CPU checks an interrupt flag in the read register 101, thereby sensing that the memory card has been inserted, and reads out the content of a card identification register, which is for detecting the memory card type, in the read register 101. This register reads in and holds the state of the detection signal, which indicates the state of the connection (card-inserted or card-removed state), of the memory card connected to corresponding external terminals of the control IC 100. The CPU is the CPU 3002 shown in FIG. 4.

This embodiment is such that the AND of two signals "CD1X" and "CD2X" among the interface signals is used as the detection signal with regard to a compact flash card. The level (state) of this detection signal changes in response to connection of the connector (terminals) of this memory card. An "INS" signal among the interface signals is used as the detection signal with regard to a memory stick. The level (state) of this detection signal changes in response to connection of the connector (terminals) of this memory card. When a smart media card or SD card has been inserted, mechanical switches (not shown) are closed. As a result, the level of the corresponding signal changes from high to low. These signals are used as the detection signals.

The above-mentioned detection signals assume the ground level (low level) when the corresponding memory cards are inserted. Further, the terminals of the control IC 100 to which the detection signals of these memory cards are input are pulled up. When a memory card has not been inserted, therefore, the corresponding detection signal is at the high level. In other words, if a memory card has been inserted, only the detection signal corresponding to the type of this memory card falls to the low level.

The detection signals of these four types of memory cards enter an input/output (I/O) signal selector 109 and an output (O) signal selector 110 as 4-bit data. The I/O signal selector 109 and the output signal selector 110 are connected to the tri-state buffer 111. A bidirectional input/output signal from the memory-card interface controller that corresponds to the detection signal having the low level among the detection signals of four bits is connected to the tri-state buffer 111 by the I/O signal selector 109, and an output signal from the memory-card interface controller that corresponds to the detection signal having the low level among the detection signals of four bits is connected to the tri-state buffer 111 by the output signal selector 110.

The tri-state buffer 111 is switched to three states, namely (1) input, (2) output and (3) high impedance. The signal from the register 103 and the signal corresponding to the type of memory card are input to the tri-state buffer 111.

As a result, the bidirectional input/output signal and the output signal of the inserted memory card are each connected to the tri-state buffer 111 by the selectors 109 and 110, respectively. The reason for providing two selectors is to divide the selectors according to the attribute (bidirectional signal or unidirectional signal) of the signal handled. Further, input signals from the memory cards 113 are connected upon being distributed to the interface controllers via the input buffer 112.

The CPU is capable of enabling the tri-state buffer 111 by setting an enable signal in the write register 103. However, in this embodiment, a gate circuit is provided so as to make it impossible to enable the tri-state buffer 111, by utilizing the four bits of the detection signals, as long as none of the memory cards has been inserted.

The write register 104 is for allowing the CPU to discriminate the type of inserted memory card, release the corresponding memory-card interface controller from the reset state and place this controller in the operating state. The memory-card interface controller to which a reset signal from the CPU has been applied attains the operating state.

By virtue of the arrangement described above, the control IC 100 is capable of making combined use of the input/output terminals of the interface signals of each of the memory cards and makes it possible to control inputs to and outputs from the memory card inserted. In other words, it is so arranged that when a memory card is inserted into the apparatus, the interface terminals take on a high impedance.

It should be noted that when a memory card is extracted from its slot, the CPU senses extraction of the card in response the interrupt signal from the interrupt generator 102, and the tri-state buffer 111 is disabled by the gate circuit.

Input/output signals in memory cards of various types are placed in three groups, namely input signal, output signals and input/output signals. IC terminals and buffers are shared among these three groups.

With regard to each input, output and input/output, buffers are provided in a number equivalent to the maximum number of terminals possessed by whichever card has the maximum number of terminals among the plurality of cards. For example, with regard to output terminals (output buffers), a memory card of type A has B-number of output terminals, which is the maximum number, among those memory cards that can be inserted, and therefore B-number of buffers are provided.

Accordingly, the selector 110 changes over the connection between the necessary number of buffers and terminals (terminals on the printer side) in accordance with the memory card inserted.

By way of example, if a memory card of type C (the number of output terminals whereof is D) has been inserted, then D-number of output buffers are used among the B number and the output buffers of the remaining B-D-number thereof are set to attain the high impedance.

In accordance with this embodiment, as described above, the number of input/output terminals for writing data to and reading data from a plurality of types of memory cards having different shapes and specifications can be made the number of input/output signals of the memory card having the largest number of input output signals, and the number of interface signals can be made the total of the number of input/output terminals plus the number of detection signals that are for detecting the connection state (card-inserted or card-removed) of each of the memory cards. This makes it possible to reduce the number of terminals of the control unit.

Further, the areas occupied by signal buffers are related as follows: input signal buffers<output signal buffers<input/output signal buffers. Accordingly, the output signal buffers or input/output signal buffers are shared, thereby making it possible to reduce the size of the control circuit.

As a result, when the control unit is fabricated as an IC, the number of terminals can be reduced by a wide margin. This makes it possible to reduce the size and lower the cost of the IC package and to conserve space on the board on which the IC is mounted.

Of course, when the IC is fabricated, unconnected (NC) terminals may exist depending upon the configuration of the package and the layout of the pins. However, the number of input/output terminals for reading or writing data here signifies the number of terminals employed for input/output signals actually used.

Other Embodiments

The circuit described in the embodiment above is one example of a circuit arrangement that implements the present invention. That the present invention can be implemented by other circuit arrangements, such as a circuit obtained by modifying the above circuit or a circuit obtained by replacing part of the above circuit, would readily occur to one skilled in the art.

Figure 9:
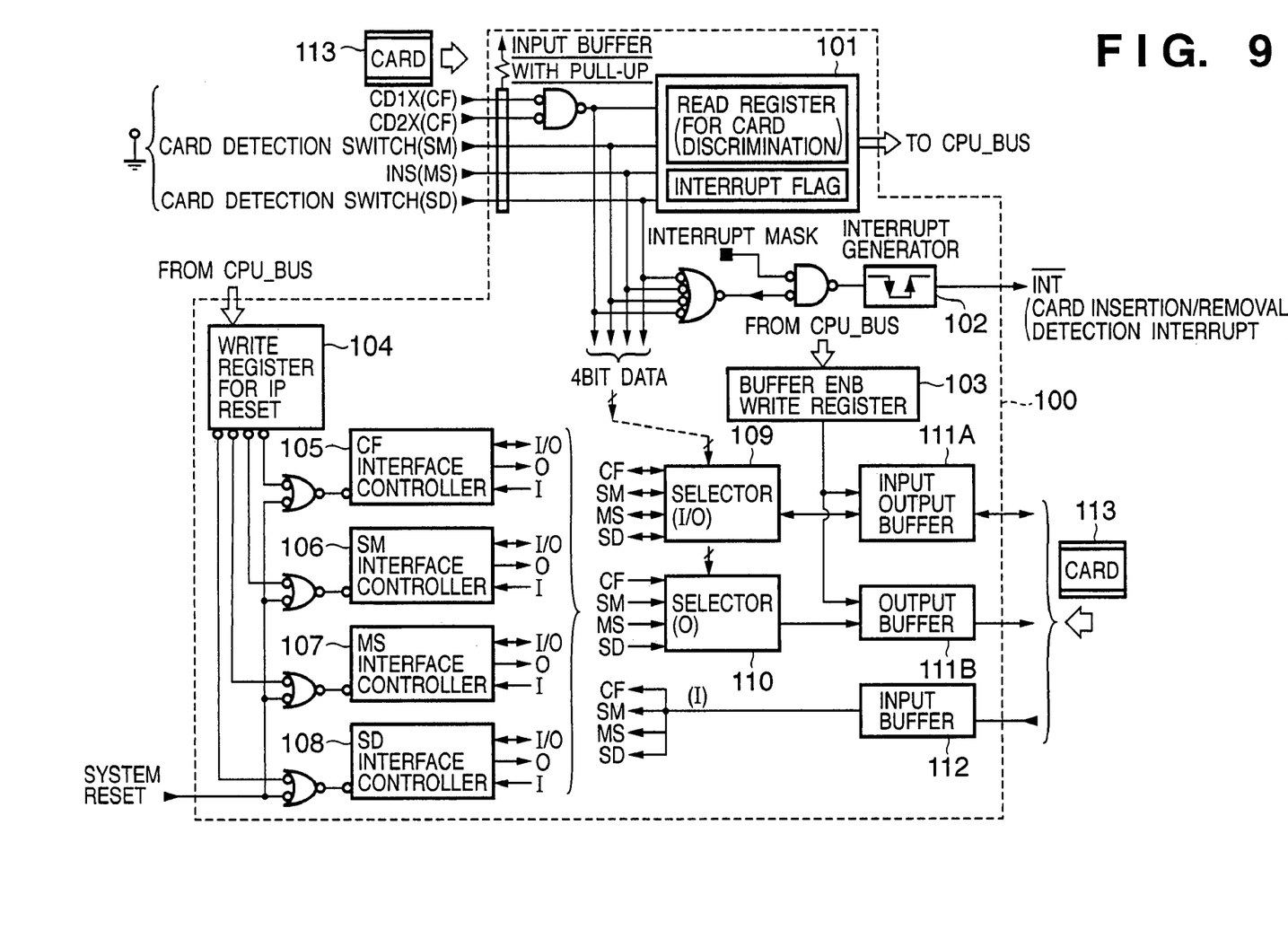
FIG. 9 is a block diagram illustrating the structure of a control unit according to another embodiment of the present invention.

For example, as illustrated in FIG. 9, an input/output buffer 111A and an output buffer (equipped with a high-impedance function) 111B may be provided instead of the tri-state buffer 111 and these may be accessed from the CPU.

It should be noted that the memory-card exclusion mechanism may be a mechanism other than that described above and can employ an arrangement that is suited to the printer structure or to the types of memory cards supported.

For example, another conceivable implementation of the exclusion mechanism in an arrangement in which a slot unit is provided with a plurality of slots corresponding to respective ones of a plurality of storage media is a shutter mechanism in which when a storage medium is inserted into an insertion port corresponding to any one of the plurality of slots, the insertion ports of the other slots are closed. Another is to shape the insertion ports to allow the insertion of storage media of a plurality of types but to not allow the insertion of other storage media after any one type of storage medium has been inserted.

In the above embodiment, a compact flash card, memory stick and smart media card are described as examples of the memory cards. However, other memory cards using semiconductor storage elements (an SD card, multimedia card, xD picture card, etc.) may also be used.

In the above embodiment, an ink-jet printer is described as an example of the printing apparatus. However, it would readily occur to those skilled in the art that a printer employing a printing method other than the ink-jet printing method may be adopted as a printing apparatus to which the present invention can be applied.

Furthermore, in the embodiment above, printing is carried out upon directly reading image data that has been stored on a memory card. However, the storage media on which the image data is stored are not limited to the above-illustrated memory cards using semiconductor storage devices, and other card-type storage media (e.g., card-shaped hard disks, etc.) may be used.

In addition, the connection between the printer and host device is achieved by a USB or IEEE 1284 interface in the above-described embodiment. However, the connection may be made via interfaces having other specifications, such as an IEEE 1394, USB2, IrDA or Bluetooth.

Further, the apparatus to which the present invention is applied is not limited to a printing apparatus (printer). The present invention is applicable to all types of apparatus that have a function for controlling inputs to and outputs from any one storage medium among a plurality of types of storage media having different shapes and specifications.

The present invention can be applied to a system comprising a plurality of devices (e.g., host computer, interface, reader, printer) or to an apparatus comprising a single device (e.g., copying machine, facsimile machine).

As many apparently widely different embodiments of the present invention can be made without departing from the spirit and scope thereof, it is to be understood that the invention is not limited to the specific embodiments thereof except as defined in the appended claims.

What is claimed is:

1. A storage media control circuit for controlling inputs and outputs to and from a plurality of types of storage media of different shapes and specifications, comprising:
   detection terminals for detecting a state of connection of respective ones of the storage media of the plurality of types;
   input/output terminals for inputting and outputting bi-directional input/output data to and from a storage medium whose connection has been detected by said detection terminals;
   buffers connected to the input/output terminals and holding at least one of output data and bi-directional input/output data, wherein the number of output signal buffers for holding output data and the number of input/output signal buffers for holding bi-directional input/output data is controllably settable;
   interface controllers for controlling interface to respective ones of the storage media of the plurality of types; and
   control means between the interface controllers and the buffers, for selecting one interface controller from among the interface controllers and connecting the selected interface controller to the buffers, and for setting the number of output signal buffers and the number of input/output signal buffers, wherein the selecting and the setting are based on signals from the detection terminals.

2. The circuit according to claim 1, further comprising an interrupt generator for generating an interrupt signal upon detecting a change in the connection state of a storage medium from an AND output of signals from the detection terminals.

3. The circuit according to claim 1, wherein the storage media of the plurality of types are memory cards using semiconductor storage elements.

4. The circuit according to claim 3, wherein the memory cards include at least one among a compact flash card, a memory stick, a smart media card, an SD card, a multimedia card and an xD picture card.

5. The circuit according to claim 1, wherein the circuit is formed as a single semiconductor device.

6. The circuit according to claim 1, the control means further comprising:
   a first selector for bi-directional input/output signals, which is connected to the interface controllers and the buffers; and
   a second selector for output signals, which is connected to the interface controllers and the buffers.

7. A printing apparatus comprising a storage media control circuit and a slot unit;
   said storage media control circuit controlling inputs and outputs to and from a plurality of types of storage media of different shapes and specifications and including:
   detection terminals for detecting a state of connection of respective ones of the storage media of the plurality of types;
   input/output terminals for inputting and outputting bi-directional input/output data to and from a storage medium whose connection has been detected by said detection terminals;
   buffers connected to the input/output terminals and holding at least one of output data and bi-directional input/output data, wherein the number of output signal buffers for holding output data and the number of input/output signal buffers for holding bi-directional input/output data is controllably settable;
   interface controllers for controlling interface to respective ones of the storage media of the plurality of types; and
   control means between the interface controllers and the buffers, for selecting one interface controller from among the interface controllers and connecting the selected interface controller to the buffers, and for setting the number of output signal buffers and the number of input/output signal buffers, wherein the selecting and the setting are based on signals from the detection terminals,
   said slot unit being capable of having storage media of a plurality of types insertable therein,
   wherein the printing apparatus is so adapted that it is possible to print image data that has been stored on the storage media.

8. A storage media control circuit for controlling inputs to and outputs from a plurality of types of storage media of different shapes and specifications, comprising:
   detection means for detecting the type of a storage medium that undergoes input/output of data;
   buffers for holding input data or output data with regard to this storage medium;
   first control means, which correspond to respective ones of the plurality of storage media, for performing control for accessing the storage media;
   selection means for selecting said buffers; and
   second control means for controlling selection of said first control means and said selection means in accordance with result of detection by said detection means.

* * * * *